US006913367B2

(12) United States Patent
Okishima

(10) Patent No.: US 6,913,367 B2
(45) Date of Patent: Jul. 5, 2005

(54) VEHICLE HEADLAMP

(75) Inventor: Kiyoshi Okishima, Setagaya-ku (JP)

(73) Assignee: Sanyo Technica Co., Ltd., Tokyo (JP)

( * ) Notice: Subject to any disclaimer, the term of this patent is extended or adjusted under 35 U.S.C. 154(b) by 0 days.

(21) Appl. No.: 10/376,587

(22) Filed: Mar. 3, 2003

(65) Prior Publication Data

US 2003/0223220 A1 Dec. 4, 2003

(30) Foreign Application Priority Data

May 31, 2002 (JP) ....................................... 2002-159571

(51) Int. Cl.[7] .................................................. B60Q 1/12

(52) U.S. Cl. ........................... 362/43; 362/50; 362/465; 362/467; 362/212

(58) Field of Search ............................ 362/43, 50, 465, 362/467, 475, 212

(56) References Cited

U.S. PATENT DOCUMENTS 5,217,087 A * 6/1993 Ikegami et al. ............. 180/219

FOREIGN PATENT DOCUMENTS

JP A 2001-035211 2/2001
JP 2001-035211 * 2/2001 ............. F21S/8/10

* cited by examiner

*Primary Examiner*—Sandra O'Shea
*Assistant Examiner*—Bertrand Zeade
(74) *Attorney, Agent, or Firm*—Oliff & Berridge, PLC

(57) ABSTRACT

There is a vehicle headlamp in a multibeam mode comprising: a reflecting mirror for reflecting light emitted from a discharge tube having a single light emitting section; and a shield for blocking off light directly emitted forward and light emitted to the lower part of the reflecting mirror out of the light emitted from the discharge tube, wherein the headlamp includes a rotationally moving device for three-dimensionally moving the light emitting section of the discharge tube to any position of the reflecting mirror, which is suitable for low-beam or high-beam, by eccentrically rotating the discharge tube to move back and forth; and a rotation controller for controlling the rotation of the rotationally moving device. The headlamp can be used in several beam modes using a conventional reflection mirror and a discharge tube.

2 Claims, 7 Drawing Sheets

VEHICLE HEADLAMP

BACKGROUND OF THE INVENTION

1. Field of the Invention

The present invention relates to a vehicle headlamp, and more particularly relates to a vehicle headlamp having a mechanism that allows the headlamp to be used in several beam modes using a discharge tube having a single light emitting section.

2. Description of the Related Art

At present, so-called projector-type or multireflector-type headlamps dominate the vehicle headlamp market, which concentrate light with high precision by arranging a reflecting mirror around a halogen lamp (iodine bulb) which is close to a point source with power consumption of 35 to 60 watts and high efficiency of about 20 lumens/watt. Two standards are set for the projector-type headlamps: PE (polyellipsoid) and DE (three-dimensional ellipsoid) type. The multireflector-type headlamps use a MS (multisurface) type.

FIG. 6 is an external view of a conventional vehicle headlamp 1. FIGS. 7A to 7C are sectional views of the vehicle headlamp 1, in which FIG. 7A shows a case in which a halogen lamp 2 is used as a light source and FIG. 7B shows a case in which a discharge tube 3, such as a xenon lamp, is used as a light source, and FIG. 7C is an enlarged view of a filament section of the halogen lamp 2. The headlamp 1 in FIG. 7A is a so-called projector-type or multireflector-type headlamp, in which two light emitting sections (filament) 52 and 50 of the halogen lamp (iodine bulb) 2 which is close to a point source with power consumption of 35 to 60 watts and high efficiency of about 20 lumens/watt, that is, a high-beam light emitting section 52 and a low-beam light emitting section 50 covered with a shade 51 are arranged in line in the direction of arrow Z (back and forth in a state in which the headlamp 1 is mounted to the vehicle), around which a reflecting mirror 55 is disposed, thereby concentrating light with high precision.

In the headlamp 1 in FIG. 7A, light beams that are emitted from the two high-beam light emitting section 52 and low-beam light emitting section 50 covered with the shade 51 are sent toward the reflecting mirror 55 in the direction of X (laterally in a state in which the headlamp 1 is mounted to the vehicle) and in the direction of Y (vertically in a state in which the headlamp 1 is mounted to the vehicle), respectively, and are reflected in the direction of Z by the reflecting mirror 55.

The halogen lamp 2 used in the headlamp 1 lights up by applying a voltage as low as 12V or 24V, thus requiring no special insulation and having an average operating time of 400 hours. Several types of specifications, called H-1 type, HB-1 type, H-4 type, HB-4 type, HB-5 type, H-7 type and so on, are set in shape, for each of which the shapes and sizes of a base mounting section (lamp holder) on the side of illuminating apparatus and a flange base on the side of the halogen lamp are standardized.

Conventionally, the low beam and high beam in the headlamp using the halogen lamp were switched by selecting two dedicated halogen lamps which are arranged at approximately the center of the reflecting mirror divided for high beam and low beam; however, recently, the high-beam light emitting sections 52 and the low-beam light emitting section 50 covered with a shade are provided side by side in one halogen lamp, as in the H-4 type shown in FIG. 7A, and are selected for illumination. More specifically, for high beam emission, only the high-beam light emitting section 52 is lit up and, for low beam emission, only the low-beam light emitting section 50 covered with the shade 51 is lit up to block off light on the side of the shade 51 and alter the reflection by the reflecting mirror, thus controlling light distribution.

On the other hand, in the halogen lamp 2 used in the headlamp 1, as shown in FIG. 7C, the relative position of the high-beam light emitting section 52 and the low-beam light emitting section 50 covered with a shade is deviated from each other. Specifically, the high-beam light emitting section 52 and the low-beam light emitting section 50 are separated, at the center point, by L2 (about 6.5 mm) in the Z direction and by L1 (about 1.2 mm) in the Y direction. Consequently, the reflecting surface of the reflecting mirror 55 is set to reflect light in a predetermined direction at each position of the high-beam light emitting section 52 and the low-beam light emitting section 50. More specifically, the high-beam light emitting section 52 and the low-beam light emitting section 50 are selectively lit up, wherein, when the high-beam light emitting section 52 is lit up, light beams IH1 and IH2 are reflected by the reflecting mirror 55 to irradiate a distance, and when the low-beam light emitting section 50 is lit up, only a light beam IL1 is reflected by the reflecting mirror 55 to become a downward light beam and irradiate a short distance.

There is also provided a discharge tube, such as a xenon lamp, as a light source taking the place of the halogen lamp 2. In this discharge tube, although the voltage applied at initial lighting is as high as about 20,000V, highly efficient 100±15% lumens/watt is provided, thus providing luminous flux twice as large as that of the halogen lamp. Also, the power consumption is only about 35 W and the operating time is more than four times as long as that of the halogen lamp. Accordingly, it is the most suited to save energy and ideal for a vehicle headlamp. The headlamp, particularly, the vehicle headlamp must be constructed to switch low-beam and high-beam; however, it is structurally difficult for the present discharge tube 3 to include two light emitting sections in the lamp itself, as in the halogen lamp 2 of the H-4 type.

Also, there is a problem of spacing in that separate two discharge tubes are provided near the center of the reflecting mirror, as in the conventional type, and it is also difficult to construct the reflecting mirror. Furthermore, it is relatively expensive in cost. Accordingly, even if the conventional discharge tube 3 is arranged as in FIG. 7B, the conventional switching of low-beam and high-beam cannot be performed, so that when a light emitting section 53 of the discharge tube 3 is arranged at a position where the high-beam light emitting section 52 of the halogen lamp 2 is to be arranged, the light beams IH1 and IH2 are reflected by the reflecting mirror 55 to irradiate only a distance.

There is provided a headlamp disclosed in Japanese Unexamined Patent Application Publication No. 2001-35211, which solves the above problems. Such a headlamp has a structure including a drive unit K for sliding a shade 67 for shielding a light emitting section 65 of a discharge tube 64 disposed at a base 61 in the direction of arrow X along the axis Z of the discharge tube 64, as shown in FIGS. 8A and 8B. FIG. 8A is a front view showing the structure of the discharge tube 64 and the base according to an embodiment of the invention disclosed in the above-mentioned application in a low-beam mode and FIG. 8B is a front view of the same in a high-beam mode. A leg 67*b* of the shade 67 is connected through the base 61 to a moving iron 69 of a solenoid 68 secured to the back of the base 61 with a rod 66 and so on. The moving iron 69 is biased at all times by a spring 60, so that when the solenoid is inoperative, a shielding surface 67*a* of the shade 67 stands in the position of the light emitting section 65 to block off the light from the discharge tube 64 partly, thus providing low-beam light distribution. The coil of the solenoid 68 is energized to draw the moving iron 69 against the stress of the spring 60 and to slide the shade 67. When the shielding surface 67*a* gets out of position of the light emitting section 65 of the discharge tube 64, light is radiated from the light emitting section 65 in almost all directions to provide high-beam light distribution.

The above method, however, has the following problems: The high-beam light emitting section 52 and the low-beam light emitting section 50 are separated at the center point by L2 in the Z direction and by L1 in the Y direction, as described above. However, in the headlamp disclosed in Japanese Unexamined Patent Application Publication No. 2001-35211, the shade 67 for shielding the light emitting section 65 is only slid in the direction of arrow X along the axis Z of the discharge tube 64. Consequently, a light emitting section can only be placed at the position of one of the high-beam light emitting section 52 and the low-beam light emitting section 50.

On the other hand, the reflecting surface of the reflecting mirror 55 is shaped to reflect light in a predetermined direction at each position of the high-beam light emitting section 52 and low-beam light emitting section 50. Accordingly, the conventionally used reflecting mirror cannot be used but a special reflecting mirror is required to irradiate a predetermined position with light, thus increasing the cost for the headlamp. Also, the standard for vehicle parts is strictly decided; for example, the shape of the reflecting mirror is standardized, as mentioned above, in which the versatility of possible shapes, sizes, installation spaces thereof is low, thus being limited in design.

Also, in the headlamp disclosed in Japanese Unexamined Patent Application Publication No. 2001-35211, the moving iron 69 of the solenoid 68 is secured to the back of the base 61 with the rod 66 and so on. The moving iron 69 is biased at all times by the spring 60. Therefore, a mechanism for moving the light emitting section 65 of the discharge tube 64 or the shade 67 must be long, thus causing various limitations to enclose such a mechanism in the standardized reflecting mirror.

SUMMARY OF THE INVENTION

Accordingly, it is an object of the present invention to provide a vehicle headlamp in which the above problems are solved and which can be used in several beam modes using a conventional reflection mirror and a discharge tube.

In order to achieve the above object, in a vehicle headlamp according to the present invention, a multibeam mode vehicle headlamp is equipped with a reflecting mirror for reflecting light emitted from a discharge tube having a single light emitting section and a shield for blocking off light directly emitted forward and light emitted to the lower part of the reflecting mirror out of the light emitted from the discharge tube having the single light emitting section. The head lamp includes a rotationally moving device for three-dimensionally moving the light emitting section of the discharge tube having the single light emitting section to any position of the reflecting mirror, which is suitable for low-beam or high-beam, by eccentrically rotating the discharge tube to move back and forth; and a rotation controller for controlling the rotation of the rotationally moving device.

In the vehicle headlamp according to the present invention, preferably, the rotation controller includes a drive unit for switching the rotating direction of the rotation axis for eccentric rotation, a timer circuit for controlling the rotation time of the rotation axis, and a switching circuit for switching the polarity of a signal applied to the rotation controller.

BRIEF DESCRIPTION OF THE DRAWINGS

FIGS. 2A to 2C are explanatory views of the discharge tube and a shade for covering it, in which FIG. 2A is a schematic side view of a control section of the discharge tube, FIG. 2B is a side view of the shade, and FIG. 2C is a side view of the control section having the shade covered thereon;

FIGS. 3A and 3B illustrate a moving operation of a light emitting section of the discharge tube, wherein FIG. 3A is a top view of a rotationally moving section and FIG. 3B is a side view thereof;

FIGS. 4A and 4B show electrical connections for supplying power to a conventional vehicle headlamp, wherein FIG. 4A shows a positive control system and FIG. 4B shows a negative control system;

FIGS. 7A to 7C are sectional views of the vehicle headlamp, in which FIG. 7A shows a case in which a halogen lamp is used as a light source and FIG. 7B shows a case in which a discharge tube is used as a light source, and FIG. 7C is an enlarged view of a filament section of the halogen lamp; and FIGS. 8A and 8B show a structure of the discharge tube and the base of the conventional vehicle headlamp, in which FIG. 8A is a front view thereof in a low-beam mode and FIG. 8B is a front view thereof in a high-beam mode.

DESCRIPTION OF THE PREFERRED EMBODIMENT

Figure 6:
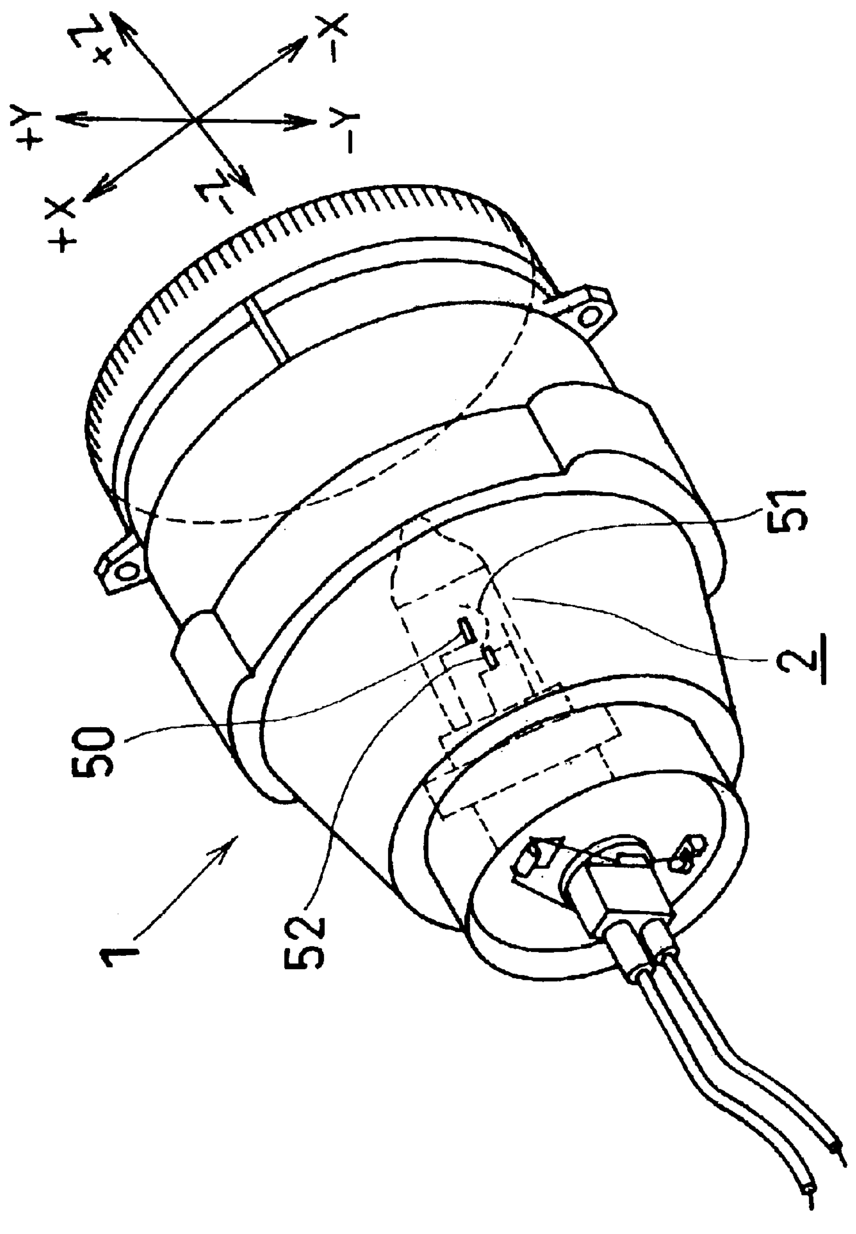
FIG. 6 PRIOR ART
FIG. 6 is an external view of the conventional vehicle headlamp.

An embodiment of a headlamp according to the present invention will be specifically described hereinbelow with reference to the drawings. The headlamp according to the present invention principally relates to a vehicle headlamp. Since a discharge tube 3, and a reflection mirror and a lens (both are now shown), etc., which are used here, are well known in the art, and a headlamp using an existing halogen lamp, as shown in FIG. 6, can be used, a description thereof will be omitted and only a low-beam/high-beam switching mechanism of the discharge tube 3 and its controller will be described.

Figure 1:
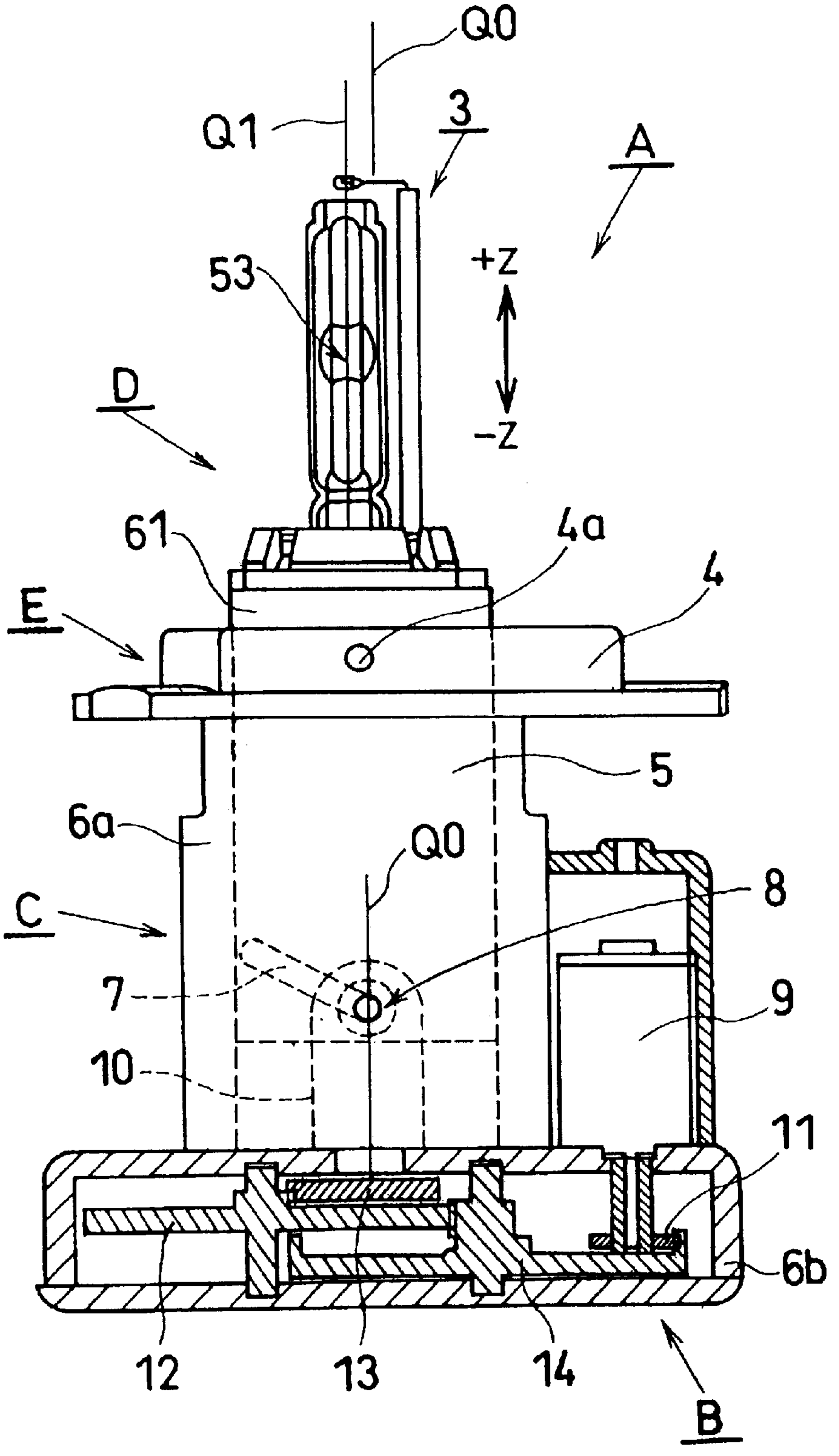
FIG. 1 is a partially sectional view illustrating a discharge tube of a vehicle headlamp and a mechanism for moving the discharge tube according to an embodiment of the present invention.

FIG. 1 is a partially sectional view showing a discharge tube 3 of a vehicle headlamp and a mechanism for moving the discharge tube 3 according to the embodiment of the present invention (hereinafter, a section shown in FIG. 1 is referred to as a discharge tube control section A for simplifying explanation). The discharge tube control section A includes a rotating mechanism B, a link mechanism C, a light source D and a main-body casing E. The rotating mechanism B includes a motor 9 and gears 11, 12, 13 and 14 enclosed in a casing 6 of the main-body casing E.

The link mechanism C includes a rotating body 10 connected to the shaft of the gear 13 and a cylindrical rotationally moving section 5. The light source D includes the discharge tube 3 and a shade 51, which is not shown in FIG. 1 but is shown in FIG. 2B. The main-body casing E includes the casing 6 (6*a* and 6*b*) and a fixing section 4. A controller for rotating the motor 9 and a power source for supplying power to the discharge tube 3 are not shown in FIG. 1.

The casing 6 of the main-body casing E is formed of the casing box section 6*b* for housing the rotating mechanism B and the casing cylinder section 6*a* for housing the rotationally moving section 5. The fixing section 4 is secured to the casing cylinder section 6*a,* and has a projection 4*a* for attaching a shade 51, which will be described later, on the side thereof. The main-body casing E is secured with the fixing section 4 from the exterior of a reflecting mirror (not shown) using a metal spring or the like so that a light emitting section 53 of the discharge tube 3 is placed in position, which will be described later.

The gear 11 in the rotating mechanism B is fitted to the rotation axis of the motor 9 and is rotated as the motor 9 rotates, as will be described later. The external gear of the gear 11 is connected to the internal gear of the gear 14, and the gear 14 is connected to the gear 12. The gear 12 is connected to the gear 13, to which the rotation of the motor 9 is transmitted with the speed decreased.

The rotationally moving section 5 of the link mechanism C is housed in the casing cylinder section 6*a* such that it can be rotated and moved in the direction shown by arrow Z while having contact with the inner wall thereof. Furthermore, the rotating body 10 is housed in the rotationally moving section 5. The rotating body 10 is fitted to and projecting from the rotation axis of the gear 13 (the central axis of rotation is denoted by reference symbol Q0), from the side of which a pin 8 projects. A slide groove 7 is formed with a slope in the inner wall of the rotationally moving section 5, into which the pin 8 is fitted so as to slidably move therein.

Figure 2A:
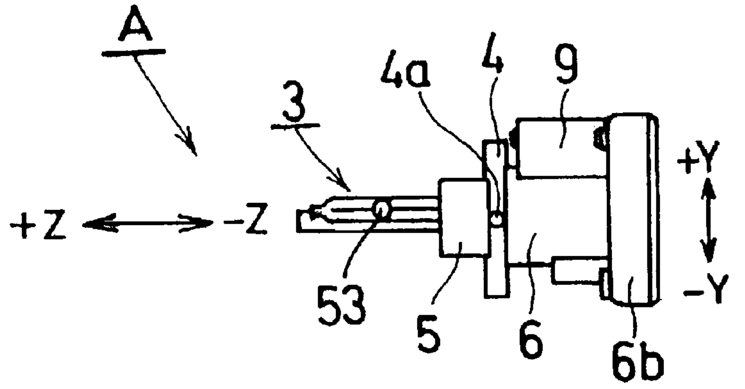
Figure 2B:
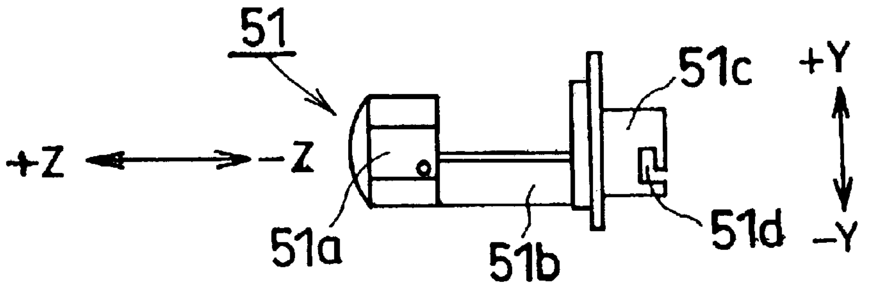
Figure 2C:
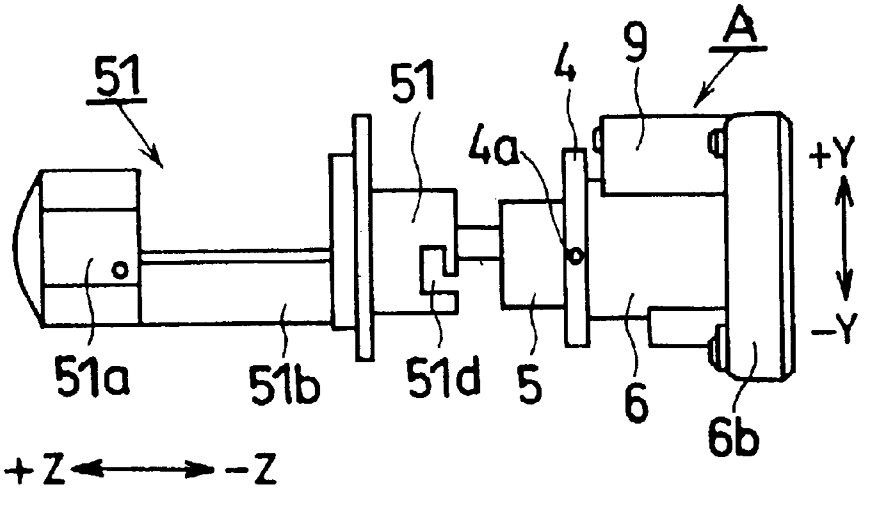

FIGS. 2A to 2C are explanatory views of the discharge tube 3 and the shade 51 for covering it, in which FIG. 2A is a schematic side view of the discharge tube control section A, FIG. 2B is a side view of the shade 51, and FIG. 2C is a side view of the discharge tube 3 of the discharge tube control section A having the shade 51 covered thereon. In FIGS. 2A to 2C, the mounting directions shown by arrows X, Y and Z are the same as those shown in FIGS. 7A to 7C. The shade 51 is cylindrical in shape, having an inner diameter sufficient to avoid contact with the discharge tube 3 even when the discharge tube 3 rotates, as will be described later, into which the discharge tube 3 is fitted from a rear 51*c*. Moreover, an umbrella-shaped shielding section 51*a* and a canaliculated shielding section 51*b* are formed at the end and bottom thereof, respectively, for blocking off the light. It is recommended that the shielding sections 51*a* and 51*b* be made of a light-blocking material, such as a thin metal plate formed by stamping, a heat-resistant synthetic resin or ceramics.

The shade 51 has a notch 51*d* formed at the rear 51*c* thereof. When the notch 51*d* is rotationally fitted to the projection 4*a* formed on the side of the fixing section 4, the shade 51 is secured to the fixing section 4. Specifically, the shade 51 is attached to the headlamp in a fixed direction (in the direction in which the shielding section 51*b* is positioned lower than the discharge tube 3). Of light emitted from the light emitting section 53 of the discharge tube 3, which is rotationally moved as will be described later, light emitted forward (in the direction shown by arrow +Z) and downward is blocked off.

The discharge tube 3 of the light source D is fitted in a base 61 disposed on the rotationally moving section 5 such that it projects from the rotationally moving section 5. The base 61 is disposed such that when the discharge tube 3 is fitted, the central axis Q1 of the light emitting section 53 is eccentric to the rotational central axis Q0 of the rotating body 10.

A reflecting mirror (not shown), in which the discharge tube control section A is to be enclosed, has a well-known structure for reflecting light in predetermined directions when the light emitting section 53 is positioned at the position of the high-beam light emitting section 52 or at the position of the low-beam light emitting section 50. More specifically, the reflecting mirror has a reflecting surface and a lens formed such that when the light emitting section is lit up at the position of the high-beam light emitting section 52, the light reflected forward from the reflecting mirror goes in the distance without diffusing in all directions and, when the light emitting section is lit up at the position of the low-beam light emitting section 50, the light reflected forwardly from the reflecting mirror diffuses laterally and downwardly and does not go in the distance. Accordingly, in the headlamp that houses inside the reflecting mirror the discharge tube control section A having the shade 51 fixed thereto, when the light emitting section 53 of the discharge tube 3 is moved to the position of the high-beam light emitting section 52 and lit up, the lower part of light reflected forwardly from the reflecting mirror is blocked off and goes in the distance without diffusing downward, the direction reversed by the reflecting mirror, and laterally.

Figure 3A:
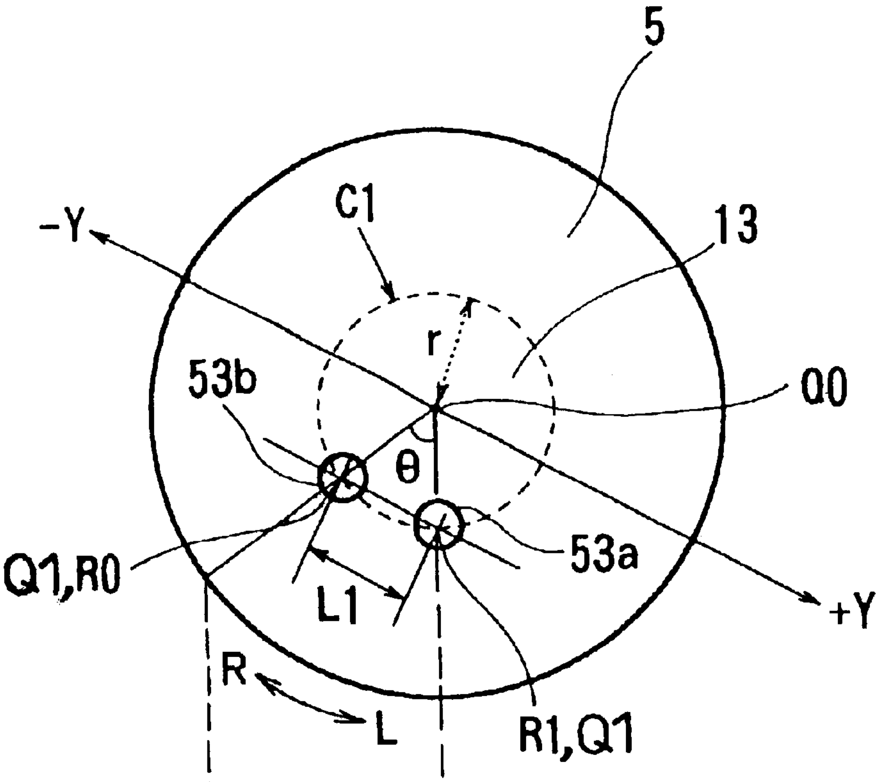
Figure 3B:
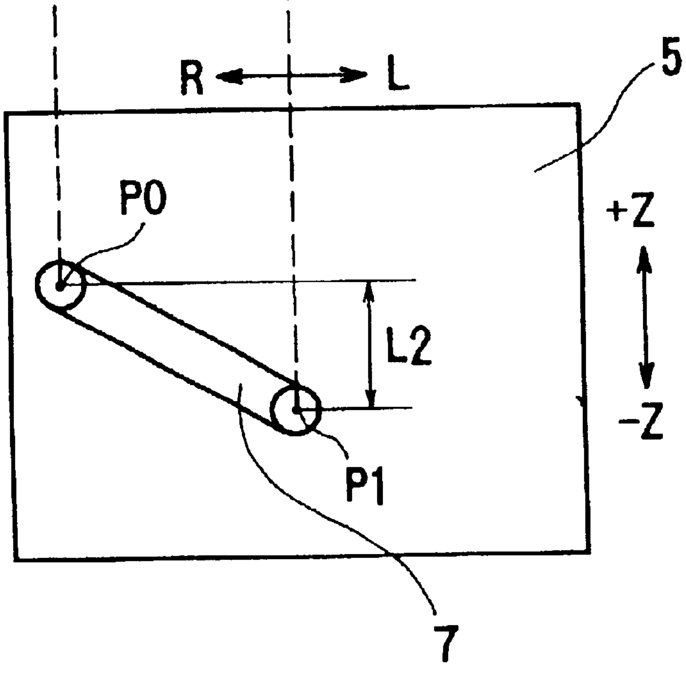
Figure 7A:
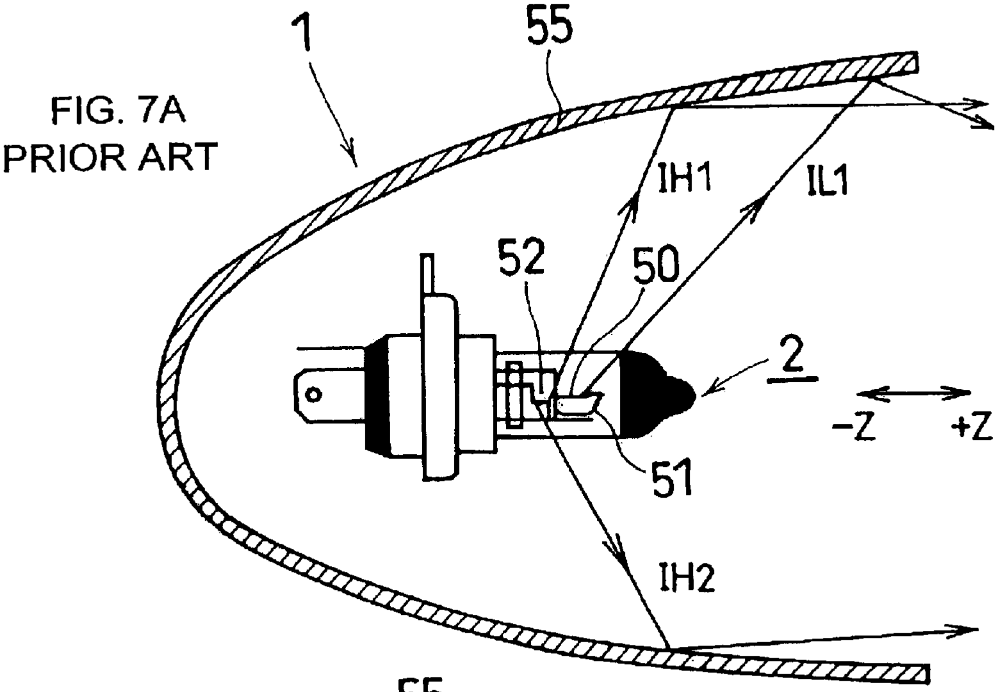
FIG. 7A PRIOR ART
Figure 7B:
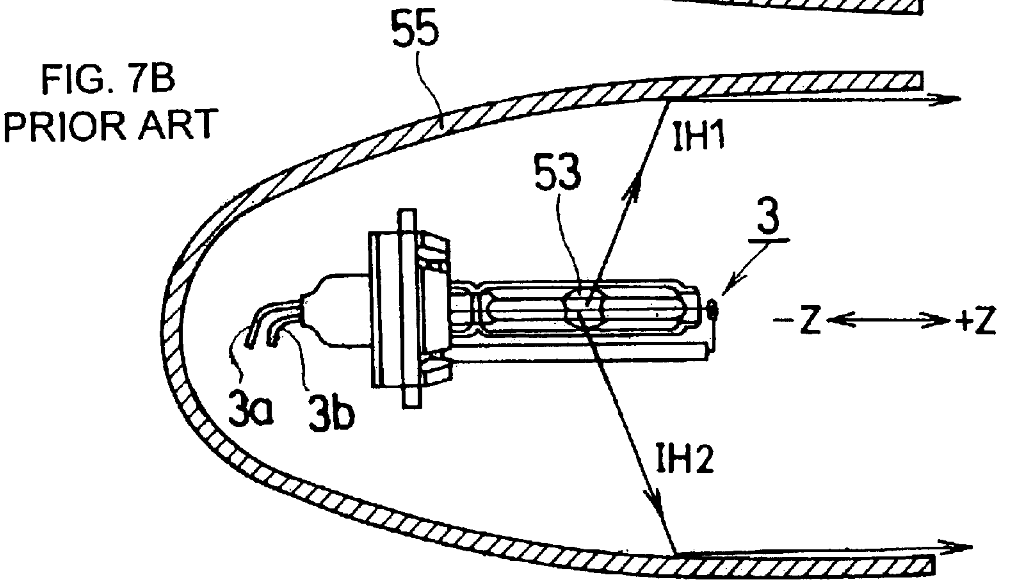
FIG. 7B PRIOR ART

In order to provide an easy understanding of the present invention, the operation of the link mechanism C will be described with reference to FIGS. 3A and 3B. FIGS. 3A and 3B illustrate the operation of the rotationally moving section 5 in which the light emitting section 53 of the discharge tube 3 is moved to the positions of the high-beam light emitting section 52 and the low-beam light emitting section 50 of the headlamp 1, which are shown in FIG. 7A. FIG. 3A is an explanatory view seen from the top of the rotationally moving section 5 and FIG. 3B is an explanatory view seen from the side thereof. In FIGS. 3A and 3B, the rotation axis of the rotationally moving section 5 is denoted by reference symbol Q0, and the rotation axis of the light emitting section 53 of the discharge tube 3 is denoted by reference symbol Q1, as in FIG. 1. The moving directions Y and Z and moving distances L1 and L2 of the light emitting section 53 are used as in FIGS. 7A to 7C.

Figure 7C:
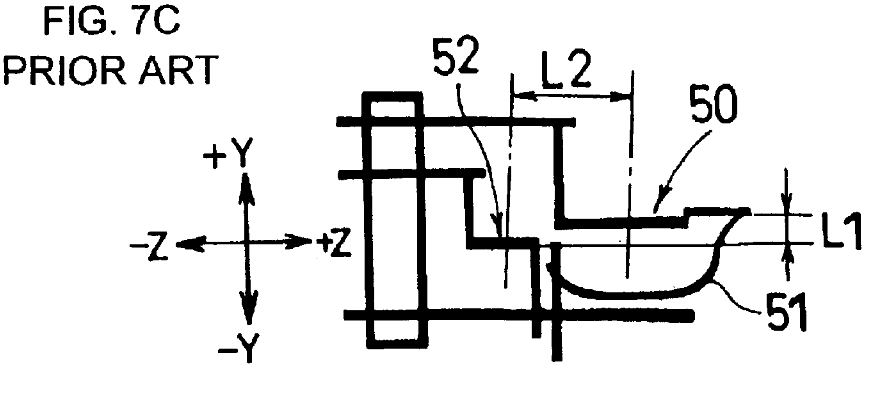
FIG. 7C PRIOR ART
Figure 8A:
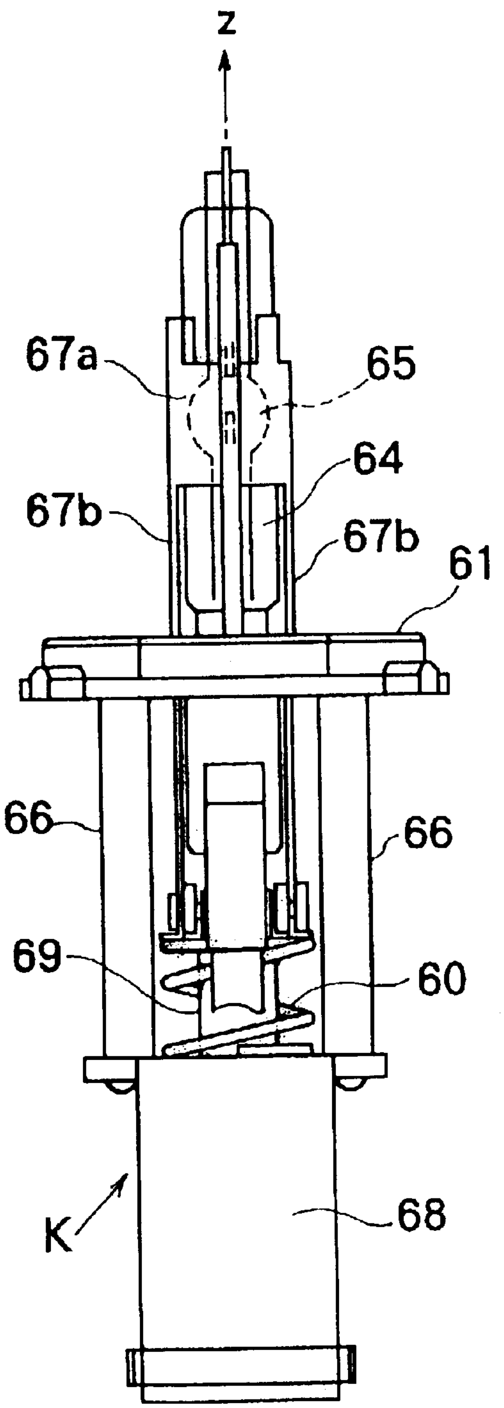
FIG. 8A PRIOR ART
Figure 8B:
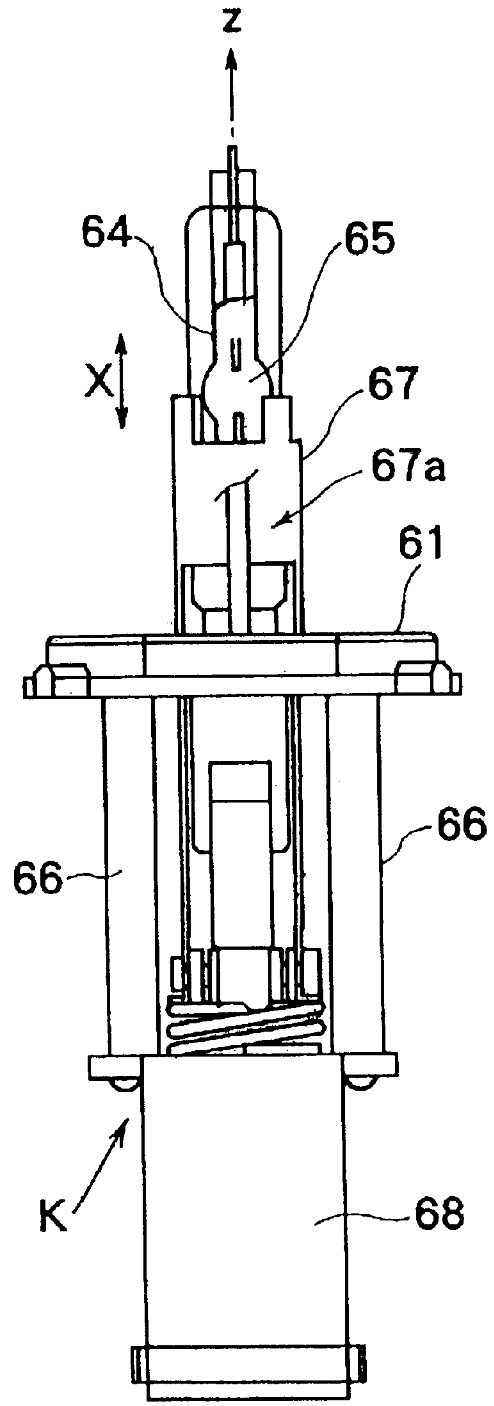
FIG. 8B PRIOR ART

As shown in FIG. 7C, the light emitting section 50 is lit up for low-beam emission. Accordingly, when the discharge tube 3 is used, the light emitting section 53 is positioned at the position of the light emitting section 50. More specifically, in FIG. 3A, the center (53*a*) of the light emitting section 53 is positioned at point R1. Similarly, the light emitting section 52 is lit up for high-beam emission. Accordingly, when the discharge tube 3 is used, the light emitting section 53 is positioned at the position of the light emitting section 52. More specifically, in FIG. 3A, the center (53*b*) of the light emitting section 53 is positioned at point R0.

On the other hand, as shown in FIG. 7C, respective centers of the light emitting sections 50 and 52 are apart from each other by the distance L1 in the direction of Y, and by the distance L2 in the direction Z, respectively. The distance between the points R0 and R1 corresponds to the distance L1. When the rotationally moving section 5 moves the distance L2 in the direction of Z, the discharge tube 3 projecting from the rotationally moving section 5 is also moved by the distance L2, and as a result, the center of the light emitting section 53 is also moved by the distance L2 in the direction of Z. More specifically, as shown in FIG. 3B, the distance in the direction of Z between opposite ends P0 and P1 of the slide groove 7, which is formed in inclination in the inner wall of the rotationally moving section 5, is the distance L2 in the direction of Z of the light emitting section 53. The ends P0 and P1 may not the opposite ends of the slide groove 7 when conditions that the distance in the direction of Z is equal to or exceed the distance L2 are satisfied.

In the above arrangement, the operation of moving the light emitting section 53 to a position suitable for high beam and low beam will be explained hereinbelow. First, a case in which the light emitting section 53 is positioned at a low beam position, that is, a case in which the center of the light emitting section 53 is positioned at point R1 will be explained. In such a case, the rotationally moving section 5 is positioned at the most forward position relative to the direction of Z, that is, the pin 8 is positioned at the end P1 in the slide groove 7. As described above, the central axis Q1 of the light emitting section 53 is disposed on the circumference C1 of the rotationally moving section 5 a radius r apart from the rotational central axis Q0 of the rotating body 10 so as to be decentered therefrom. Consequently, when the rotationally moving section 5 is rotated in the direction of R shown in FIGS. 3A and 3B by a rotation controller (not shown), the central axis Q1 of the light emitting section 53 moves on the circumference C1. When the distance between points R1 and R0 on a position parallel to the direction of Y is set to become equal to the distance L1, the light emitting section 53 is moved in the direction of Y suitable for high beam emission when the rotationally moving section 5 rotates an angle θ.

When the rotationally moving section 5 rotates an angle θ, the pin 8 projecting from the rotating body 10 which is coaxial with the rotationally moving section 5 slides in the slide groove 7 from the end P1. Since the pin 8 projecting from the rotating body 10 does not move in the direction of Z, the rotationally moving section 5 is moved in the direction of −Z as the pin 8 slides in the slide groove 7 toward the end P0. When rotating a predetermined amount of rotation (angle θ), the rotationally moving section 5 is moved to the most backward position relative to the direction of Z, that is, the pin 8 is moved to the end P0 in the slide groove 7. When the distance in the direction of Z between the ends P1 and P0 is set to become equal to the distance L2, the center of the light emitting section 53 is moved by the distance L2 in the direction of −Z. Consequently, the light emitting section 53 is moved in the direction of Z suitable for high beam emission.

Accordingly, the light emitting section 53 can be moved from the position suitable for low beam emission to the position suitable for high beam emission by spirally rotating the rotationally moving section 5 in such a way that the central axis Q1 of the light emitting section 53 is decentered from the rotational central axis Q0 of the rotationally moving section 5. In other words, by eccentrically rotating the discharge tube 3 while moving it forward and backward by the motor 9, the light emitting section 53 thereof can be moved to an arbitrary position in three dimension, thereby being moved to the position in the reflecting mirror, which is suitable for low beam or high beam.

On the other hand, when the light emitting section 53 is moved from the position suitable for high beam emission to the position suitable for low beam emission, the light emitting section 53 can be moved as in the above by rotating the rotationally moving section 5 in the direction of L opposite to the above. More specifically, the light emitting section 53 is rotated from point R0 (the end P0) in the direction of L to move the rotationally moving section 5 forwardly (in the direction of +Z). The rotational quantum may be controlled by adjusting, for example, rotation time as well as the rotation angle.

Figure 4A:
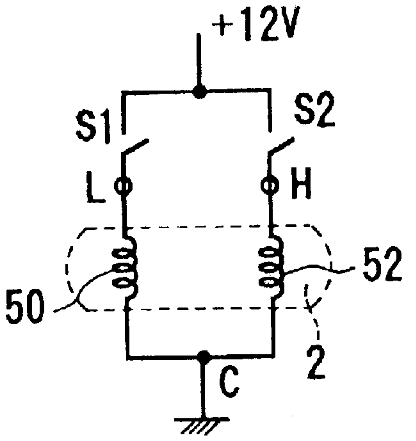
FIG. 4A PRIOR ART
Figure 4B:
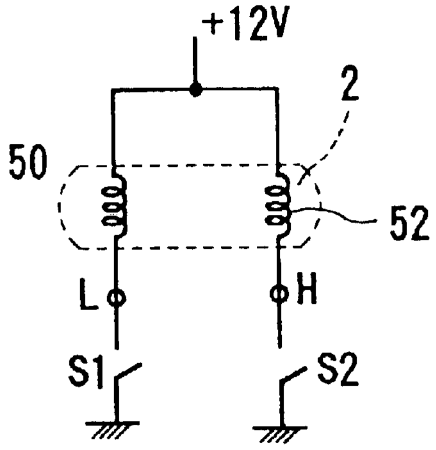
FIG. 4B PRIOR ART
Figure 5:
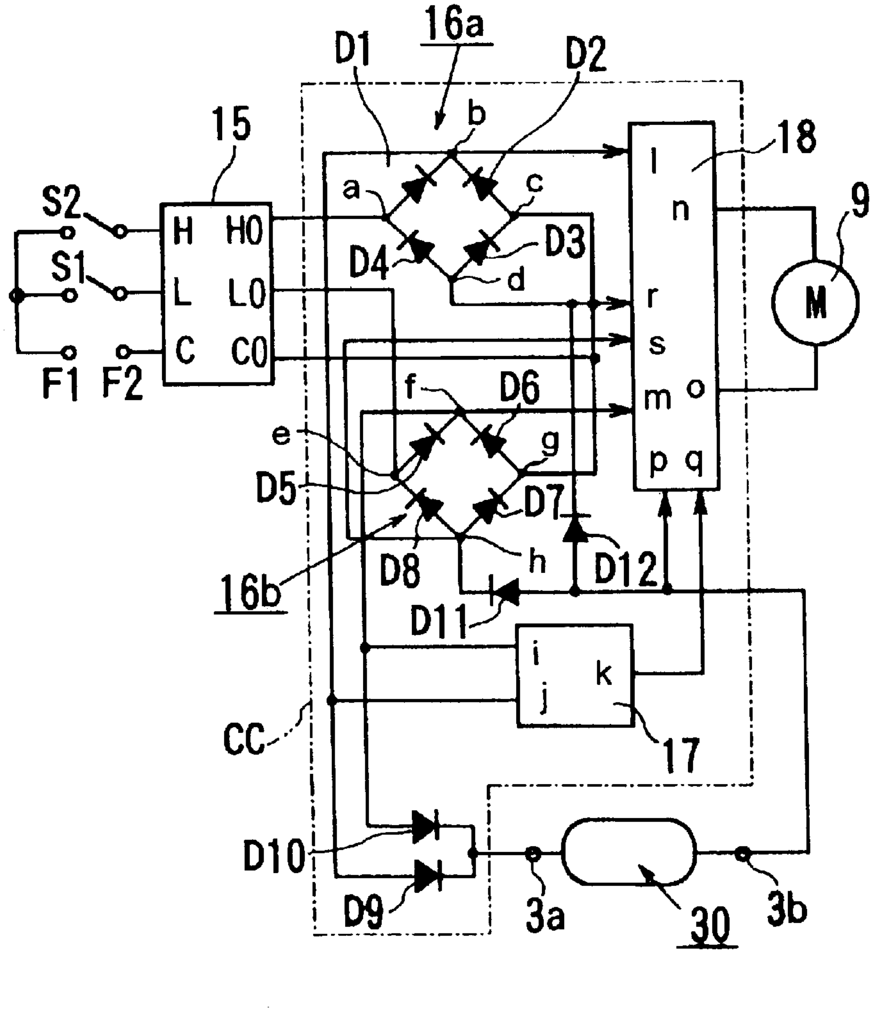
FIG. 5 is a schematic circuit diagram showing an embodiment of a rotation controller and connections with its peripheral devices.

An embodiment of the rotation controller for controlling the rotation of the rotationally moving section 5 will be described with reference to FIGS. 4A and 4B, and FIG. 5. FIGS. 4A and 4B show electrical connections for supplying power to the conventional headlamp, for explaining the operation of the rotation controller, FIG. 4A showing a positive control system and FIG. 4B showing a negative control system. FIG. 5 shows a schematic circuit diagram of an embodiment of a rotation controller CC and connections with its peripheral devices.

In the positive control system shown in FIG. 4A, one terminal of each of the high-beam and low-beam light emitting sections 52 and 50 of the halogen lamp 2 is connected to a common terminal C of a connecter (not shown), thereby being connected to an earth terminal of the vehicle. The other terminals of the light emitting sections 52 and 50 are connected to terminals L and H of a connector (not shown), respectively. The terminals L and H carry a voltage of 12V through switches S1 and S2, respectively. In the negative control system shown in FIG. 4B, one terminal of each of the high-beam and low-beam light emitting sections 52 and 50 of the halogen lamp 2 is connected to a common terminal C of a connecter (not shown), and carries a voltage of 12V. The other terminals of the light emitting sections 52 and 50 are connected to terminals L and H of a connector (not shown), respectively. The terminals L and H are each connected to an earth terminal of the vehicle through switches S1 and S2, respectively.

In either of the positive control system and negative control system, upon closing the switch S1, voltage is applied to the low-beam light emitting section 50, and low beam light is radiated. Upon closing the switch S2, voltage is applied to the high-beam light emitting section 52, and high beam light is radiated. The positive control system and the negative control system are adopted depending on the type of vehicles. It is more economical that the rotation controller can be used in both control methods, which decreases vehicle assembly steps.

Referring to FIG. 5, the rotation controller CC can be used in both of the positive control system and negative control system and includes the following components: a drive unit 18 for switching the rotating direction of the rotation axis which rotates eccentrically, a timer circuit 17 for controlling the rotation time for the rotation axis, and switching circuits 16*a* and 16*b* for switching the polarity of a signal applied to the rotation controller CC. The switching circuits 16*a* and 16*b* are diode-bridge rectifying circuits composed of diodes D1 to D4 and D5 to D8, respectively, the terminals a, c and g, and e are connected to terminals H0, C0 and L0 of a connector 15, respectively.

Respective terminals b and f of the switching circuits 16*a* and 16*b* are connected to input terminals j and i of the timer circuit 17 and input terminals l and m of the drive unit 18, respectively, and are connected to respective anode terminals of diodes D9 and D10. Respective cathode terminals of the diodes D9 and D10 are connected to one terminal 3*a* of a relay-contact driving coil 30 for switching a relay contact connected to a power source for lighting up a discharge tube (not shown). Furthermore, a terminal d which is the node of anodes of diodes D3 and D4 of the switching circuit 16*a* and a terminal h which is the node of anodes of diodes D7 and D8 of the switching circuit 16*b* are connected to input terminals r and s of the drive unit 18, respectively. The terminals d and h are connected to cathode terminals of diodes D12 and D11, respectively. Anode terminals of the diodes D12 and D11 are each connected to an earth terminal p of the drive unit 18 and also connected to the other terminal 3*b* of the relay-contact driving coil 30. Output terminals n and o of the drive unit 18 are each connected to the motor 9.

An output terminal k of the timer circuit 17 is connected to an input terminal q of the drive unit 18. Power-supply voltage (not shown) is applied to the timer circuit 17 and the drive unit 18. The timer circuit 17 is a well-known Schmitt trigger circuit which is activated on the basis of time determined by a time constant of, for example, a resister and a capacitor, and the drive unit 18 is a well-known full-bridge circuit, which perform the following predetermined operations. To the input terminals i and j of the timer circuit 17, signals for activating the timer circuit 17 are applied. Input terminals l and m of the drive unit 18 are terminals where signals for determining the rotating direction of the motor 9 are applied. The signals are applied to the input terminals of the well-known full-bridge circuit.

FIG. 5 also shows the connections with the respective switches S1 and S2 of the positive control system and the negative control system, shown in FIGS. 4A and 4B, and the relay-contact driving coil 30. The terminals H and L of the connector 15 are connected to one terminal of each switch S2 and S1, respectively. The other terminals of the switches S2 and S1 are connected to a terminal F1, and a terminal C of the connector 15 is connected to a terminal F2. In the positive control system, the terminal F1 is connected to a 12V power source and the terminal F2 is grounded. In the negative control system, the terminal F1 is grounded and the terminal F2 is connected to the 12V power source.

The discharge tube 3 is connected from the respective output terminals b and f of the switching circuits 16*a* and 16*b* to one terminal 3*a* of the relay-contact driving coil 30 via the diodes D9 and D10, and from the respective output terminals d and h of the switching circuits 16*a* and 16*b* to the other terminal 3*b* of the relay-contact driving coil 30 so that it lights up even when the switches S1 and S2 are closed in both of the positive control system and negative control system. Also, the relay-contact driving coil 30 may be connected in other ways; for example, the terminals H and L and the terminal C of the connector 15 may be connected to one terminal 3*a* of the relay-contact driving coil 30 and the other terminal 3*b*, respectively. In such a case, even when either of the switches S1 and S2 is closed, the connection is established so that the voltage of the terminals H and L of the connector 15 is applied to the first terminal 3*a* of the relay-contact driving coil 30.

As described above, the positive control system and negative control system have different polarities of voltage applied to the connector 15. In the positive control system, as shown in FIG. 4A, the terminal C is grounded and a voltage of +12V is applied to the terminals H and L via the switches S2 and S1, respectively. In the negative control system, as shown in FIG. 4B, a voltage of +12V is applied to the terminal C and the terminals H and L are grounded via the switches S2 and S1, respectively.

In the positive control system, the terminal F1 is impressed with +12V voltage and the terminal F2 is grounded. In such a case, for example, when the switch S2 is closed, the light emitting section 53 of the discharge tube 3, shown in FIG. 1, is moved to the position for high beam emission as follows: When the switch S2 is closed to apply +12V voltage to the terminal H and ground the terminal C, the switching circuit 16*a* is brought into conduction, so that the +12V voltage is applied to respective input terminals j and l of the timer circuit 17 and the drive unit 18, and the earth terminal p is grounded. When +12V voltage is applied to the input terminal j of the timer circuit 17, the timer circuit 17 outputs a signal to the output terminal k during a predetermined period of time and the motor 9 is rotated in a predetermined direction (the direction in which the rotationally moving section 5 rotates in the direction of R in FIGS. 3A and 3B) for the predetermined period of time (time that it rotates an angle θ in FIGS. 3A and 3B) by the drive unit 18 under the signal.

When the switch S1 is closed, the light emitting section 53 of the discharge tube 3 is moved to a low-beam position as follows: When the switch S1 is closed to apply +12V voltage to the terminal L and ground the terminal C, the switching circuit 16*b* is brought into conduction, so that the +12V voltage is applied to respective input terminals i and m of the timer circuit 17 and the drive unit 18, and the earth terminal p is grounded. When the +12V voltage is applied to the input terminal i of the timer circuit 17, the timer circuit 17 outputs a signal to the output terminal k during a predetermined period of time, so that the motor 9 is rotated in a predetermined direction (the direction in which the rotationally moving section 5 rotates in the direction of L in FIGS. 3A and 3B) for the predetermined period of time (time that it rotates an angle θ in FIGS. 3A and 3B) by the drive unit 18 under the signal.

In the negative control system, the terminal F1 is grounded and the terminal F2 is impressed with +12V voltage. In such a case, for example, when the switch S2 is closed, the light emitting section 53 of the discharge tube 3 is moved to the position for high beam emission as follows: When the switch S2 is closed to apply +12V voltage to the terminal C and ground the terminal H, the switching circuit 16*a* is brought into conduction, so that the +12V voltage is applied to respective input terminals j and l of the timer circuit 17 and the drive unit 18, and the earth terminal p is grounded. When +12V voltage is applied to the input terminal j of the timer circuit 17, the timer circuit 17 outputs a signal to the output terminal k during a predetermined period of time, so that the motor 9 is rotated in a predetermined direction (the direction in which the rotationally moving section 5 rotates in the direction of R in FIGS. 3A and 3B) for the predetermined period of time (time that it rotates an angle θ in FIGS. 3A and 3B) by the drive unit 18 under the signal.

When the switch S1 is closed, the light emitting section 53 of the discharge tube 3 is moved to a low-beam position as follows: When the switch S1 is closed to apply +12V voltage to the terminal C and ground the terminal L, the switching circuit 16*b* is brought into conduction, so that the +12V voltage is applied to respective input terminals i and m of the timer circuit 17 and the drive unit 18 and the earth terminal p is grounded. When the +12V voltage is applied to the input terminal i of the timer circuit 17, the timer circuit 17 outputs a signal to the output terminal k during a predetermined period of time, so that the motor 9 is rotated in a predetermined direction (the direction in which the rotationally moving section 5 rotates in the direction of L in FIGS. 3A and 3B) for the predetermined time (time that it rotates an angle θ in FIGS. 3A and 3B) by the drive unit 18 under the signal.

Switching circuits (not shown), which use a transistor for example, are connected in series to the input terminals l and m of the drive unit 18, respectively, and operate as will be described later so that even when the +12V voltage is applied to the input terminals l and m of the drive unit 18 simultaneously in the negative control system, the voltage applied to any one of the input terminals become effective. In other words, in the negative control system, the terminal F1 is grounded and the terminal F2 is impressed with the +12V voltage. For example, when the switch S2 is closed to apply +12V voltage to the terminal C and ground the terminal H, the diode D2 of the switching circuit 16*a* is brought into conduction, the input terminals j and l are each impressed with the +12V voltage, the earth terminal p is grounded, and also the diode D6 of the switching circuit 16*b* is brought into conduction to apply the +12V voltage to the input terminal m of the drive unit 18. Accordingly, in this state, unless the voltage applied to the input terminal m is made ineffective and the voltage applied to the input terminal l is made effective, a problem occurs in that the motor 9 cannot be rotated in a predetermined direction. The same can be said for the case in which the switch S1 is closed. Unless the voltage applied to the input terminal l is made ineffective and the voltage applied to the input terminal m is made effective, a problem occurs in that the motor 9 cannot be rotated in a predetermined direction.

In order to solve the above problems, the voltage that is applied to signal lines each connected to input terminals r and s of the drive unit 18 from the respective terminals d and h of the switching circuits 16*a* and 16*b* is applied as control signals for the switching circuits (not shown) to activate the switching circuits as follows: When the switch S2 is closed to apply +12V voltage to the terminal C and ground the terminal H, the terminal L is opened. As a result, the input terminal r of the drive unit 18 is grounded via the diode D4, but a cathode terminal of the diode D8 is opened and the input terminal s of the drive unit 18 connected to an anode terminal of the diode D8 is opened. The switching circuits (not shown) provided for the drive unit 18 are closed when the input terminal r or s of the drive unit 18 is grounded, and are opened when it is opened. Accordingly, only the signal voltage applied to the input terminal l of the drive unit 18 becomes effective to rotate the motor 9 in a predetermined direction.

The similar goes on when the switch S1 is closed and +12V voltage is applied to the terminal C and the terminal L is grounded. Specifically, when the switch S1 is closed to apply +12V voltage to the terminal C and ground the terminal L, the terminal H is opened. Consequently, the input terminal s of the drive unit 18 is grounded via the diode D8; however, a cathode terminal of the diode D4 is opened and the input terminal r of the drive unit 18 that is connected to an anode terminal of the diode D4 is opened. The switching circuits (not shown) provided for the drive unit 18 are closed when the input terminal r or s of the drive unit 18 is grounded, and are opened when it is opened. Accordingly, only the signal voltage applied to the input terminal m of the drive unit 18 becomes effective to rotate the motor 9 in a predetermined direction.

As described above, the switching circuits (not shown) connected in series to the respective input terminals l and m of the drive unit 18 make only one of the input terminals l and m of the drive unit 18 effective, even in the negative control system, to allow the motor 9 to rotate in a predetermined direction.

The operation of the discharge tube control section A, which is activated by the rotation controller CC, will be described hereinbelow, returning to FIG. 1. In either the positive control system or negative control system, when either of the switches S1 and S2 is closed, the motor 9 rotates in a predetermined direction for a predetermined period of time. The gear 11 fitted to the rotation axis of the motor 9 is rotated with the rotation of the motor 9. The rotation of the motor 9 is decreased in speed through the gears 11, 14 and 12 and transmitted to the gear 13. The rotating body 10, which is fitted to and projects from the rotation axis (the central axis of the rotation is Q1) of the gear 13, is rotated with the rotation of the gear 13. When the rotating body 10 rotates, the pin 8 projecting from the side thereof moves in the slide groove 7 formed in a slanting position in the inner wall of the rotationally moving section 5.

Since the pin 8 projecting from the rotating body 10 does not move in the direction of Z, as the pin 8 slides in the slide groove 7, the rotationally moving section 5 is moved in the direction of Z. The discharge tube 3 is secured to the rotationally moving section 5 and the axis of the light emitting section 53 of the discharge tube 3 and the axis of the rotationally moving section 5 are decentered from each other. Consequently, the light emitting section 53 moves spirally to positions in the directions of Y and Z, which are suitable for high-beam and low-beam emission. The discharge tube 3 of the discharge tube control section A is covered with the shade 51, so that the light distribution of low beam and high beam of the discharge tube 3 can be switched by moving the light emitting section 53 to the above positions.

According to the present invention, there is provided a vehicle headlamp capable of switching light distribution of high beam and low beam by moving a light emitting section using a simple rotation mechanism. A light source having a single light emitting section, such as a discharge tube, and a reflecting mirror, as known in the art, can be used, thus remarkably improving the performance of a vehicle headlamp.

The vehicle headlamp according to the present invention can be used irrespective of whether the positive control system or the negative control system is adopted for supplying power to the vehicle headlamp, so that there is no need to use different parts depending on the type of vehicles. Consequently, it is economical and the vehicle assembly steps can be decreased.

What is claimed is:

1. A vehicle headlamp in a multibeam mode comprising:

a reflecting mirror for reflecting light emitted from a discharge tube having a single light emitting section; and a shield for blocking off light directly emitted forward and light emitted to the lower part of the reflecting mirror out of the light emitted from the discharge tube, in which the headlamp includes a rotationally moving device that three-dimensionally moves the light emitting section of the discharge tube to any position of the reflecting mirror, which is suitable for low-beam or high-beam, by eccentrically spiraling the discharge tube to move in three dimensions; and a rotation controller for controlling the rotation of the rotationally moving device.

2. The vehicle headlamp according to claim 1, wherein the rotation controller includes a drive unit for switching the rotating direction of the rotation axis for eccentric rotation, a timer circuit for controlling the rotation time of the rotation axis, and a switching circuit for switching the polarity of a signal applied to the rotation controller.

* * * * *